April 21, 1931.  K. N. MATTHEWS  1,801,517

PISTON CONSTRUCTION

Filed Feb. 21, 1927

INVENTOR:
KINCHEN N. MATTHEWS
BY
ATTORNEY

Patented Apr. 21, 1931

1,801,517

UNITED STATES PATENT OFFICE

KINCHEN N. MATTHEWS, OF CLEVELAND HEIGHTS, OHIO

PISTON CONSTRUCTION

Application filed February 21, 1927. Serial No. 169,790.

My invention relates to connections suitable for use in joining a piston to a piston rod so as to make the piston self-alining and is applicable to that class of engines having removable cylinder heads and pistons provided with removable heads, as is shown for example in U. S. Letters Patent Nos. 1,618,600 and 1,618,601, issued to me February 22, 1927.

Specifically the present invention constitutes an improvement in the construction shown and described in said patents in so far as they relate to the connection between the piston and the piston rod, its object being to simplify such construction and reduce the number of parts and at the same time retain the desired self-alining features thereof.

The said invention consists of means hereinafter fully described and particularly set forth in the claims.

The annexed drawing and the following description set forth in detail certain means for carrying out my invention, the disclosed means, however, constituting but one of the various mechanical forms in which the principle of my invention may be employed.

Figure 4:
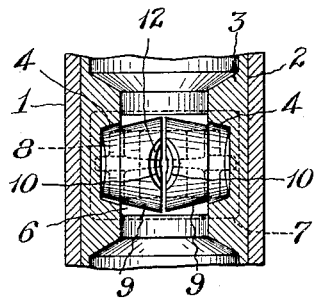
Fig. 4 represents a detail transverse section taken upon the plane indicated by line IV—IV, Fig. 2.

In the illustrated embodiment of my invention, the piston 1 is provided with the cylindrical transverse bearing 2 in which is seated a wrist-pin 3. The latter is formed with an internal seat 4 of double frustoconical form as shown, and intersected at the top by a cylindrical hole 5 and at the bottom by an opening 6 which alines with an opening 7 formed intersecting the bottom of bearing 2. Said opening 7 is elongated in the plane perpendicular to the wrist-pin axis so as to allow the piston rod to oscillate upon such axis, as shown in Figs. 2 and 3.

The upper end portion of the piston rod 8 is split and is hence expansible, and is formed with two oppositely disposed lugs 9—9 of frusto-conical shape and adapted to fit the seat 4 in the wrist-pin. The opposed upper end portions of the inner surfaces of the rod are intersected by conical-screw threads 10—10.

Figure 2:
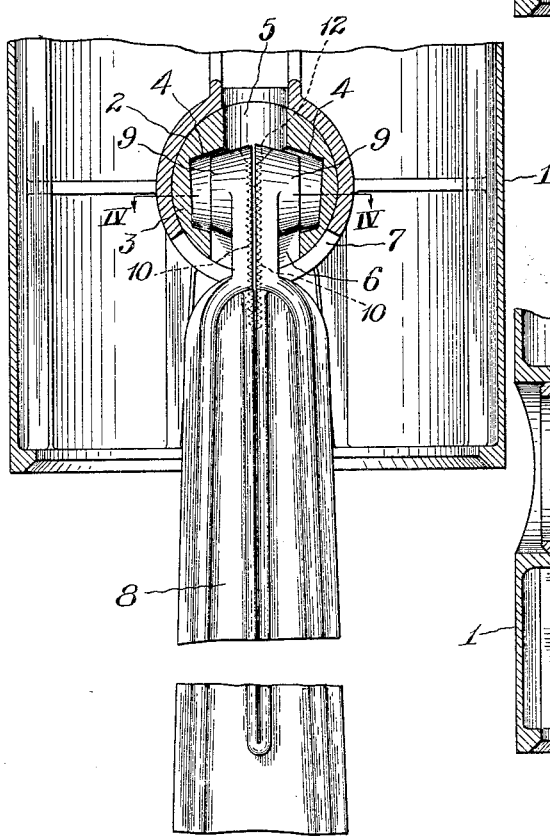
Fig. 2 represents a similar axial section, the plane of section, however, passing at right angles to the wrist-pin axis, and illustrating the position of the parts during one stage of assembly.

The width of the opening 6 is such as to permit the insertion therethrough of the lugs 9—9 when the rod is not expanded, as shown in Fig. 2, so as to bring them within the internal seat 4, the normal condition of the sections of the piston rod 8 being a collapsible one.

Figure 3:
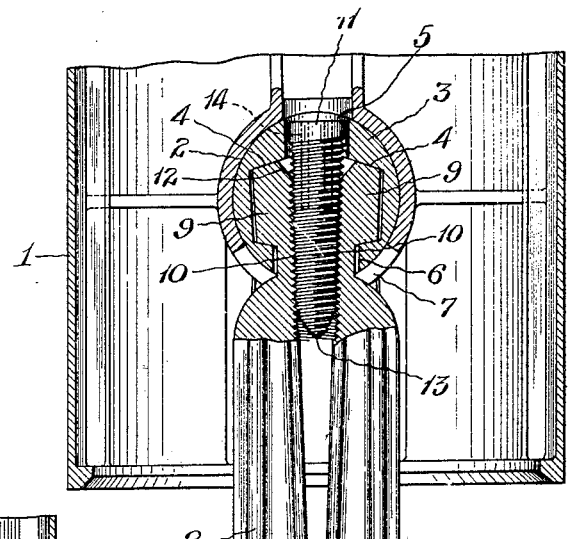
Fig. 3 represents a view similar to that of Fig. 2, showing the rod end in section and all the parts assembled.

The upper opening 5 permits of the introduction of a conical or tapered screw 11 which is caused to engage the threads 10—10, expand the rod end and cause the lugs 9—9 to engage the seat 4, as shown in Fig. 3.

Figure 1:
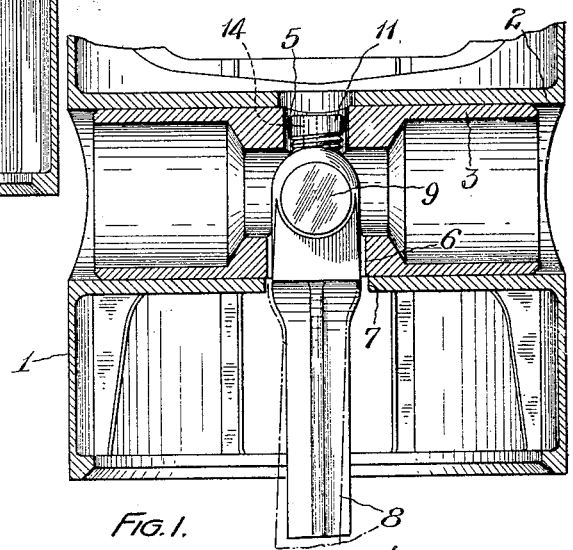
Figure 1 represents an axial fragmentary section of a piston and piston rod embodying the said invention, the plane of section also passing through the wrist-pin axis, the end of the rod being shown in elevation.

The width of the opening 6 is less than that of the seat 4, as shown in Figs. 2 and 3, so that when the rod end is expanded, it cannot be withdrawn from the said seat, as will be understood. The length of said opening 6 and the opening 7 is somewhat greater than the dimension of the adjacent rod part, as shown in Fig. 1, so that the rod may have a given amount of freedom to move upon the axis of the lugs 9, as indicated by dotted lines in said figure.

The upper end of the threaded slot formed by the split in the rod is somewhat enlarged, as at 12, Fig. 4, and the lower end of the screw sufficiently reduced, as at 13, Fig. 3, to permit the ready starting of the engagement of the screw with the threads 10, in assembling the parts, as will be understood. The screw is provided with a polygonal recess 14 intersecting its top, shown in dotted lines in Fig. 3, for the reception of a tool for turning it during such assembling, as will be understood.

It will therefore be seen that the piston rod, in addition to its oscillating movement about the wrist-pin axis, also has a given amount of adjustability in the joint formed as above described in a plane at right angles to the plane of such oscillation, so that in the event of end play in the crankshaft, undue wear on the sides of the connecting-rod bearing, or a bent connecting-rod, there will be an automatic alining or adjusting movement of the connecting-rod so that the piston will travel truly, without side strain, and hence without abnormal wear in the cylinder such as would take place without such self-alining character or ability.

It will also be observed that the particular construction above described imparts this desired characteristic in a very simple manner and with a minimum number of parts. Furthermore, all tensile strains in the connecting rod are transmitted to the piston through the lugs 9 and not through the screw 11, and which is a distinct advantage, as it relieves such screw from all duty excepting that of effecting the proper assembly of the parts. When it is desired to remove the piston from the cylinder, it is not necessary to tear down the motor to any extent, but simply to remove the cylinder head and then take out the screw 11, when the upper end of the connecting rod 8 will automatically assume its normal condition, i. e., a collapsed condition, and then the piston can be lifted out through the top of the cylinder.

What I claim is:

1. The combination of a piston provided with a transverse bearing; a wrist-pin mounted in said bearing and formed with an internal seat having an axis at right angles to the axis of the pin; and a connecting-rod having its end fitting in said seat and capable of adjustment therein at right angles to the plane of oscillation of the rod about the pin's axis.

2. The combination of a piston provided with a transverse bearing; a wrist-pin mounted in said bearing and formed with an internal seat and with an opening of less width than said seat and communicating with same; a connecting-rod having its end in said seat and having an expansible end portion adapted to pass through said opening; and means for expanding said end portion into said seat, whereby the connecting-rod is secured in the latter.

3. The combination of a piston provided with a transverse bearing; a wrist-pin mounted in said bearing and formed with an internal seat and with an opening of less width than said seat and communicating with same; a connecting-rod having a split end portion and laterally projecting lugs engaging said seat; the opposing internal end surfaces of the rod being intersected by tapered threads; and a tapered screw engaging said threads to expand said rod end to effect the engagement of said lugs with said seat.

4. The combination of a piston provided with a transverse bearing; a wrist-pin mounted in said bearing and formed with a horizontal bearing portion the axis of which is at right angles to the axis of the piston bearing; and a detachable connecting-rod formed with an integral journal portion mounted in said wrist-pin bearing, said connecting-rod having freedom of movement relative to the piston and wrist-pin bodies in a direction at right angles to the axis of said horizontal bearing.

5. The combination of a piston provided with a transverse bearing; a wrist-pin mounted in said bearing; and a connecting-rod provided with a split journal, said wrist-pin having an internal bearing in which said split journal is expanded and said wrist-pin having an opening of a size and form permitting insertion of the journal into the pin before expansion of the journal while preventing withdrawal therefrom after expansion.

6. The combination of a piston provided with a transverse bearing; a wrist-pin mounted in said bearing and provided with an internal bearing; a connecting-rod provided with an expansible journal, said wrist-pin having an opening of such size and form as to permit insertion of the journal into the internal bearing; and means maintaining the journal in expanded condition in the internal bearing.

7. In combination with a piston having a detachable head and a transverse bearing, a wrist-pin mounted in said bearing and provided with an internal bearing; a connecting-rod provided with an expansible journal expanded into said internal bearing; and means cooperating with said journal for expanding the latter into the internal bearing and for maintaining said journal in expanded condition, said means being accessible from the upper part of the piston when the piston head is detached.

8. In a piston having a detachable head and a transverse bearing, a wrist-pin provided with an internal bearing; a connecting-rod provided with an expansible journal; and means maintaining said journal expanded in said internal bearing, said means being insertible from the upper part of the piston into the wrist-pin and journal to expand the latter into the internal bearing.

9. A joint comprising a wrist-pin having an internal bearing, a connecting-rod having a split journal expanded in the internal bearing, said wrist-pin having an opening of a size permitting insertion of the journal before expansion and preventing withdrawal after expansion, and means maintaining the journal expanded in the internal bearing.

10. A joint comprising a wrist-pin and a connecting-rod having cooperating bearing members, one of said bearing members being expansible to permit ready assembly of the bearing members, and means for removably holding said expansible bearing member in bearing contact with the other bearing member.

11. In a piston having a detachable head and a transverse bearing, a wrist-pin mounted in said transverse bearing and provided with a bearing; a connecting-rod provided with an expansible journal; and means maintaining said journal in bearing contact with said second-mentioned bearing, said means being accessible from the upper part of the piston when the piston head is detached.

12. In combination with a piston having a wrist-pin provided with a bearing, a connecting-rod having an expansible journal, and means maintaining said journal in bearing contact with said bearing, said means being accessible from the upper part of the piston.

13. In combination with a piston having a wrist-pin provided with a bearing, a connecting-rod having a split journal mounted in said bearing and means maintaining said journal in bearing contact with said bearing, the parts of said split journal having frusto-conical bearing surfaces.

14. In a piston having a wrist-pin member and a connecting-rod member, a joint between said members comprising a bearing on one of said members, an expansible journal on the other of said members, said journal being seated in said bearing, and means maintaining the journal in bearing contact with the bearing.

15. A connecting-rod adapted for use in a piston construction having a wrist-pin provided with a bearing, said connecting-rod having an expansible journal for mounting in said bearing and having means for expanding said journal and for maintaining said journal in bearing contact with said bearing.

16. A wrist-pin having spaced bearing members provided with frustro-conical bearing surfaces, said wrist-pin being transversely perforated between the bearing members and at right angles to the axis of said bearing members.

17. In combination with a piston provided with a transverse bearing, a wrist-pin mounted in said bearing and provided with a horizontal bearing portion the axis of which is at right angles to the axis of the piston bearing, and a connecting-rod formed with an integral journal portion detachably mounted in said wrist-pin bearing, said connecting-rod having freedom of movement relative to the piston and wrist-pin in a direction at right angles to the axis of said horizontal bearing and said transverse piston bearing being formed with an aperture through which the connecting-rod extends.

Signed by me this 17th day of February, 1927.

KINCHEN N. MATTHEWS.